United States Patent [19]

Willson et al.

[11] 4,028,736

[45] June 7, 1977

[54] MOTOR PROTECTION CIRCUIT UNIT

[75] Inventors: James R. Willson, Trumbull, Conn.; Hugh J. Tyler, Santa Ana, Calif.

[73] Assignee: RobertShaw Controls Company, Richmond, Va.

[22] Filed: Dec. 19, 1975

[21] Appl. No.: 642,219

[52] U.S. Cl. .............................. 361/29; 318/473; 361/27

[51] Int. Cl.² ...................................... H02H 7/08

[58] Field of Search ............ 317/13 R, 13 A, 13 B, 317/13 C, 31, 33 SC, 36 TD, 37, 41, 52, 141 S, 27 R; 318/473, 474, 476, 477

[56] References Cited

UNITED STATES PATENTS

| | | | |
|---|---|---|---|
| 3,404,313 | 10/1968 | Happel et al. | 317/41 |
| 3,487,265 | 12/1969 | Aaland | 317/52 X |
| 3,609,461 | 9/1971 | Obenhaus et al. | 317/36 TD X |
| 3,619,668 | 11/1971 | Pinckaers | 317/13 R X |
| 3,660,718 | 5/1972 | Pinckaers | 317/36 TD X |
| 3,721,866 | 3/1973 | McIntosh | 318/474 X |
| 3,721,880 | 3/1973 | Neill | 317/13 B X |
| 3,731,148 | 5/1973 | Fournis | 317/27 R X |
| 3,742,302 | 6/1973 | Neill | 317/13 R |
| 3,753,043 | 8/1973 | Plouffe | 317/13 A |
| 3,774,082 | 11/1973 | Chang | 317/13 A X |

*Primary Examiner*—J D Miller
*Assistant Examiner*—Patrick R. Salce
*Attorney, Agent, or Firm*—O'Brien & Marks

[57] ABSTRACT

A motor protection circuit has a current sensing means connected in series with a contactor winding energization circuit for sensing current flow to initiate operation of a delay after break circuit or to maintain an oil pressure protection circuit unoperated.

13 Claims, 4 Drawing Figures

MOTOR PROTECTION CIRCUIT UNIT

BACKGROUND OF THE INVENTION

1. Field of the Invention

The invention relates to motor protection circuits such as circuits for preventing restart of a motor for a predetermined duration after termination of the operation of the motor or circuits to stop operation of a motor when oil pressure fails for too long a duration. Such protection circuits can be employed in compressor motors for refrigeration or cooling systems.

2. Description of the Prior Art

The prior art, as exmplified in U.S. Pat. Nos. 3,435,289, No. 3,619,668, No. 3,660,718, No. 3,721,832, No. 3,721,866, No. 3,721,880, No. 3,742,303, No. 3,774,082, No. 3,794,858, No. 3,814,991 and No. 3,858,102, contains a number of motor protection circuits including circuits which employ timing facilities for preventing restarting of a compressor motor until after a predetermined delay from shut down. The prior art utilized timing circuits and devices directly connected with a control switch or the circuit energizing a contactor winding in order to initiate a delay period in response to a change in voltage conditions in the energization circuit for the contractor winding. One particular prior art motor protection system employed an electrical protection unit including a low oil pressure protection circuit, a thermal protection circuit, a delay after break circuit, a first opto-isolator relay responsive to the voltage across a contactor winding, and a second opto-isolator relay directly responsive to the voltage across one or more control switches in the contactor winding circuit, the first opto-isolator relay controlling the initiation of the time delay circuit upon cessation of voltage across the contactor winding, and the second opto-isolator relay preventing operation of the oil pressure protection circuit in the presence of a voltage condition across the control switches; however if the leads to the contactor winding and the control switches or the input power leads are reversed in the prior art motor protection system the opto-isolators would sense the wrong voltages and thus would render the system inoperable; the proper connection of such leads is subject to error as well as often being difficult during replacement of the electrical protection unit in existing systems because of obscured markings identifying the proper leads.

Current transformers having primary windings connected directly in the power lines to the compressor motor, or ferromagnetic current sensing loops coupled to the power line leads to the motor, have been utilized to sense the magnitude of current through the leads to operate a control circuit for the motor to prevent damage and to initiate a delay period after cessation of current to prevent restart until after am appropriate delay. However, such current tranformers and current sensing devices must be installed in the heavy current leads to the motor which necessitates the installation of the current transformers or sensing devices external to electronic modular protection units thus increasing the number of components, complexity, size, and difficultness of repair of the system external to the modular electrical control unit.

SUMMARY OF THE INVENTION

The invention is summarized in a protection circuit unit for connection in a motor protection system including a contactor having a contactor winding and contacts operated when the contactor winding is energized to connect the motor to an electrical source, the circuit unit including switch means for connection in series with the contactor winding to control the energization of the contactor winding from an AC source, current sensing means connected in series with the switch means for producing a signal indicating current flow through the contactor winding, and timing means responsive to termination of the signal from the current sensing means for preventing operation of the switch means for a predetermined duration.

An object of the invention is to construct a protection circuit unit containing protective circuits responsive to energization or deenergization of a contactor for a motor wherein the leads to the contactor and control switches may be reversed or the input leads from the power line may be reversed without affecting the operation of the motor system.

Another object of the invention is to construct an electrical circuit unit including a current sensor connected in series with a switching means for a contactor winding a sense the current through the contactor winding to control the operation of a protection circuit.

It is also an object of the invention to utilize a pair of parallel opposite polarity diodes, a transformer, or the like for sensing current in a contactor winding circuit to simultaneously control operation of a delay after breaK circuit and an oil pressure protection circuit.

Other objects, advantages and features of the invention will become apparent from the following description of the preferred embodiment and the accompanying drawings.

DESCRIPTION OF THE PREFERRED EMBODIMENT

Figure 1:
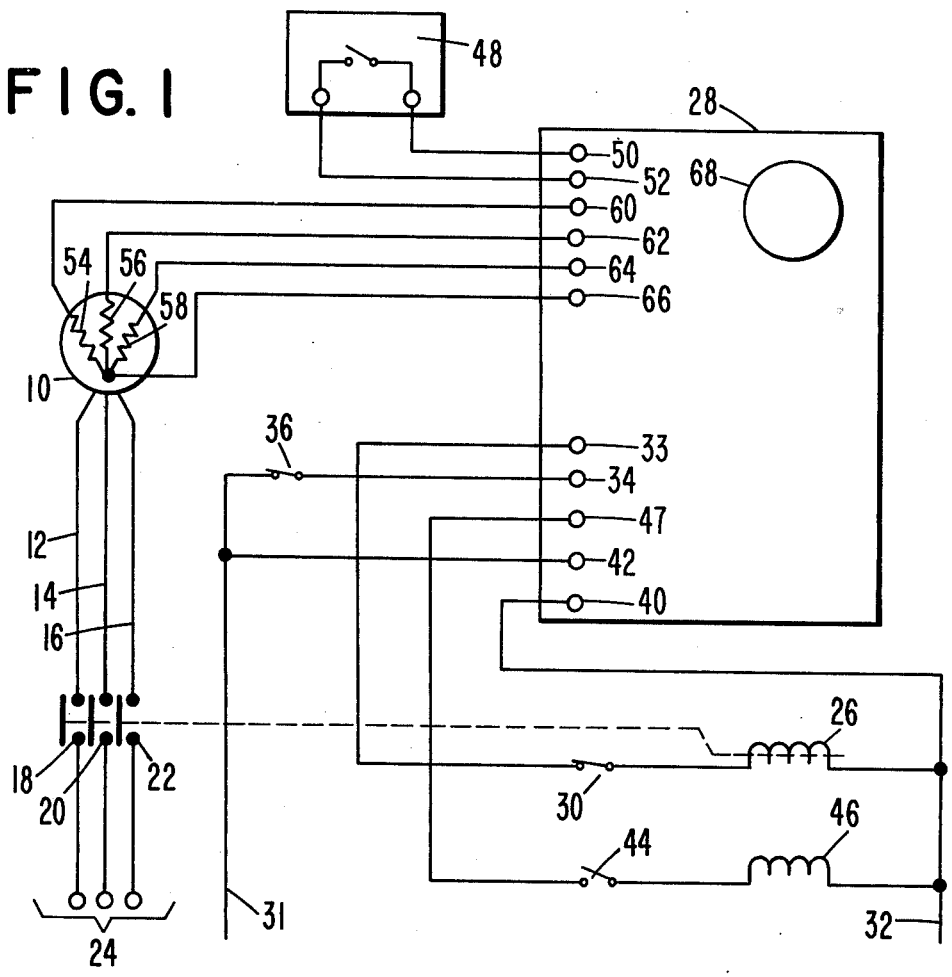
FIG. 1 is a diagram of a motor protection system in accordance with the invention.

As shown in FIg. 1, the invention is embodied in a motor protection circuit for protecting a motor, such as a compressor motor 10 in a refrigeration or cooling system. The motor 10 is adapted to be energized by electrical power on lines 12, 14 and 16 which are connected in series with respective normally open contacts 18, 20, and 22 to an AC source such as a three phase power source 24. The contacts 18, 20 and 22 are part of a contactor which also includes a winding 26 which when energized operates the contactor to close the contacts 18, 20 and 22. The contactor winding 26 is connected in a circuit which includes an electrical circuit unit 28 and various other controls, such as switches, for controlling the operation of the motor 10.

In the circuit illustrated in FIG. 1, the winding 26 is connected in series with contacts 30 between a power line 32 of a pair of power lines 31 and 32 and a terminal 33 of the unit 28. The contacts 30 are normally closed contacts of a low pressure switch responsive to a low pressure on the suction side of the compressor. The power lines 31 and 32 may be suitably coupled to one phase of the AC source 24 or to another suitable AC power source. A second terminal 34 of the unit 28 is connected through contacts 36 to the power line 31. The contacts 36 are normally closed contacts of a high pressure switch responsive to excessive high pressure in the output of the compressor. The unit 28 also has terminals 40 and 42 which are connected to the power lines 31 and 32. A series connection of room temperature relay contacts 44 and solenoid 46 of a valve is connected between a terminal 47 of the unit 28 and the power line 32. The room temperature relay contacts 44 are such as to be operated by a temperature responsive device located in the chamber being cooled and serves to thermostatically control the operation of the compressor motor 10. The valve controlled by the solenoid 46 is designed to control the refrigerant flow in the suction line to the compressor. A normally open lubricating or oil pressure sensing switch 48 is connected between terminals 50 and 52 of the unit 28. Three thermal sensing resistances, such as lengths 54, 56 and 58 of positive temperature coefficient wires embedded in respective windings of the motor 10, have one ends connected to the respective terminals 60, 62 and 64, of the unit 28 and have their other ends commonly joined to a terminal 66 of the unit 28. The unit 28 also has a push button oil reset switch 68.

Figure 2:
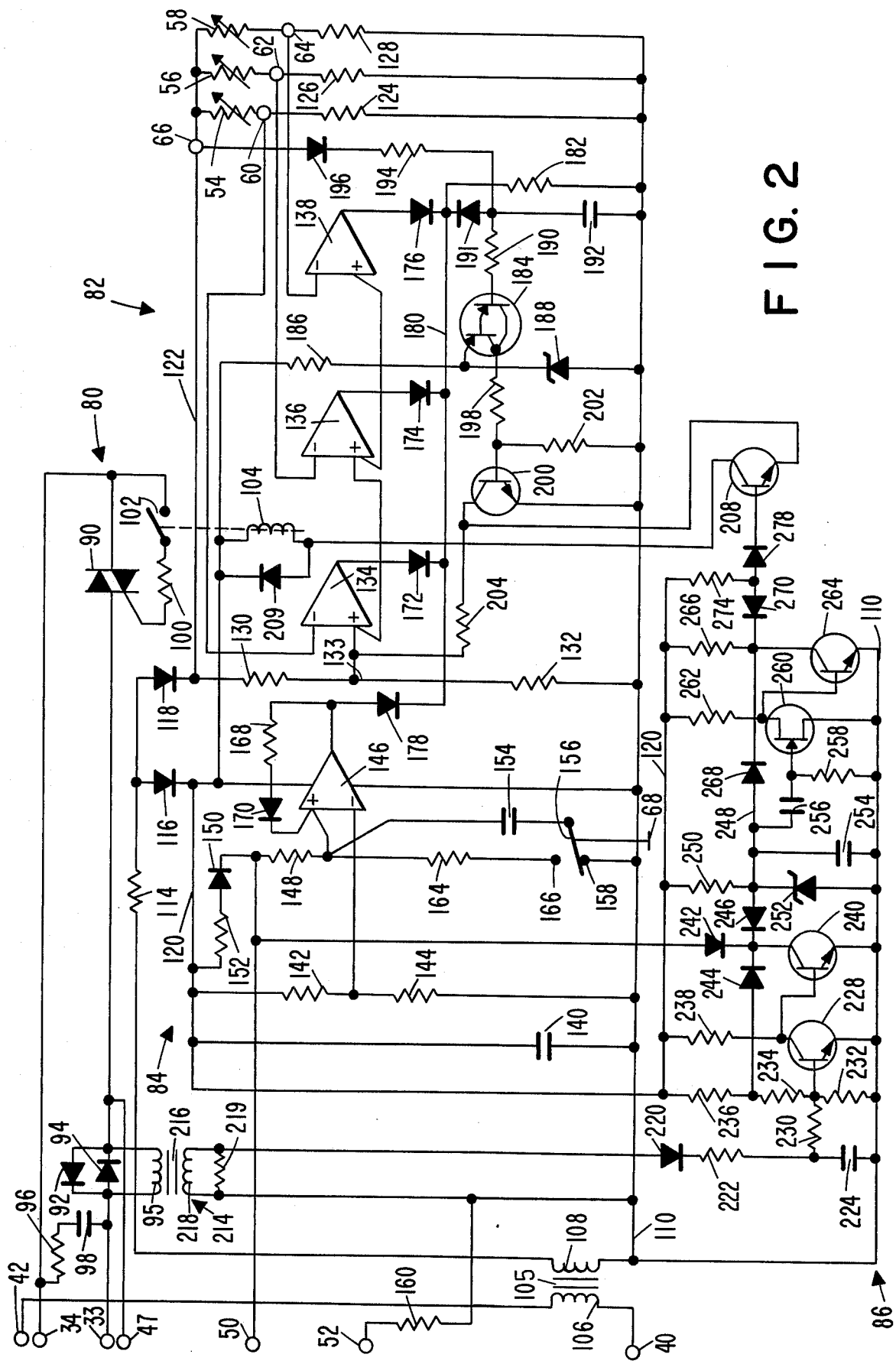
FIG. 2 is a circuit diagram of the circuitry contained within a circuit unit of the motor protection system of FIG. 1.

The circuitry within the unit 28 is illustrated in FIG. 2 and includes a load or motor contractor switching circuit indicated generally at 80, a thermal protection circuit indicated generally at 82, an oil pressure protection circuit indicated generally at 84, and a delay after break circuit indicated generally at 86.

In the load circuit 80, switch means such as a triac 90 is connected in series with current sensing means such as a parallel arrangement of oppositely poled diodes 92 and 94 and a transformer primary winding 95 between the terminals 33 and 34. The terminal 47 is connected to the junction between the diodes 92 and 94 and the triac 90. A series circuit including a resistance 96 and a capacitance 98 is connected across the terminals 33 and 34; the resistance 96 and the capacitance 98 having values selected to limit the rate of voltage rise across the triac 90 and to reduce the chance of false triggering of the triac 90. The control electrode of the triac 90 is connected to the terminal 34 by a resistance 100 connected in series with normally open contacts 102 of a relay which has a winding 104 for operating the contacts 102.

An isolation transformer 105 has a primary winding 106 connected across the terminals 40 and 42 and has a secondary winding 108 which is connected at one end to a common node or junction 110. The other end of the winding 108 is connected by a resistance 114 to the anodes of diodes or rectifiers 116 and 118 which have their cathodes connected to respective unipolarity junctions 120 and 122. A filter capacitance 140 is connected across the unipolarity junction 120 and the common junction 110.

In the thermal protection circuit 82, the terminal 66 is connected to the unipolarity power junction 122 while resistances 124, 126 and 128 have one ends connected to the respective terminals 60, 62 and 64 with the other ends of the resistances 124, 126 and 128 connected together to the common junction 110. A voltage dividing circuit including series circuit resistances 130 and 132 is connected across the unipolarity power junction 122 and the common junction 110 and has an intermediate junction 133 between the resistances 130 and 132 connected to the non-inverting inputs of operational amplifiers 134, 136 and 138 which have their respective inverting inputs connected to the respective terminals 60, 62 and 64. The values of the thermally responsive resistances 54, 56 and 58, the resistances 124, 126 and 128, and the resistances 130 and 132 are selected such that at normal temperatures sensed by the resistances 54, 56 and 58, the inverting inputs of the operational amplifiers 134, 136 and 138 are positive with respect to their non-inverting inputs, and a excessively high temeratures sensed by one or more of the resistances 54, 56 and 58, the inverting inputs of the respective operational amplifiers 134, 136 and 138 are negative with respect to their non-inverting inputs.

In the oil pressure protection circuit 84, a pair of resistances 142 and 144 are connected in series across the unipolarity power junction 120 and the common junction 110 and have their intermediate junction connected to the inverting input of an operational amplifier 146 which together with the operational amplifiers 134, 136 and 138 may be a quad amplifier integrated circuit which has its power terminals connected to the power junctions 120 and 110. A timing resistance 148 is connected at one end to a cathode of a diode 150 which has its anode connected by a resistance 152 to the junction 120. The other end of the timing resistance 148 is connected to the non-inverting input of the amplifier 146 and to one side of a timing capacitance 154 which has its other side connected to the contact arm 156 of the switch 68 which has its normally closed contact 158 joined to the common terminal 110. The terminal 50 is connected to the junction between the diode 150 and resistances 148 while the terminal 52 is connected by a resistance 160 to the common junction 110. The values of the resistances 142 and 144 as well as the values of the resistance 152, the timing resistance 148 and capacitance 154 are selected to maintain the non-inverting input of the amplifier 146 negative with respect to the inverting input when the pressure switch between the terminals 50 and 52 is closed or the junction between the diode 150 and the resistance 148 is held low, and are selected to result in the non-inverting input of the amplifier 146 becoming positive with respect to its inverting input when the oil pressure switch between the terminals 50 and 52 remains open for an excessive period of time after start up. A suitable discharge resistance 164 is connected between the normally open contact 166 of the switch 68 and the junction between the resistance 148 and the capacitance 154. The output of the amplifier 146 is connected by a series resistance 168 and a diode 170 to the non-inverting input of the amplifier 146 such as to provide a locking circuit for the amplifier 146 when its output goes high.

The outputs of the amplifiers 134, 136, 138 and 146 are connected to the anodes of respective diodes 172, 174, 176 and 178 which have their cathodes joined together at an OR junction 180 which is normally biased low by a resistance 182 connected between the junction 180 and the common junction 110. The emitter lead of a PNP Darlington pair 184 is connected to the junction of one end of a resistance 186 and the cathode of a zener diode 188; the other end of the resistance 186 being connected to the power terminal 120, and the anode of the zener diode 188 being connected to the common junction 110. The base input of the Darlington pair 184 is connected by a resistance 190 to the anode of a diode 191 which has its cathode connected to the junction 180. A filtering capacitance 192 is connected between the anode of the diode 191 and the common junction 110. One end of a bias resistance 194 is connected to the junction between the resistance 190 and the capacitance 192 while the other end of the resistance 194 is connected to the cathode of a diode 196 which has its anode connected to the unipolarity power junction 122. The value of the bias resistance 194 is substantially greater than the value of the resistance 182 but is sufficient to bias the base input of the Darlington pair 184 high when the diode 191 has been rendered non-conductive by a high on junction 180. The collector output of the Darlington pair 184 is connected by a resistance 198 to the base of an NPN switching transistor 200 which has its emitter connected to the junction 110. The base of the transistor 200 is connected by a bias resistance 202 to the common junction 110. A resistance 204 is connected between the collector of the transister 200 and the junction 133 and has a value selected to produce a predetermined hysteresis effect in the thermal protection circuit 82, i.e., the resistance 204 has a value selected to change the voltage on the terminal 133 when the transistor 200 is conductive to cause the thermal responsive circuit to respond to a higher temperature sensed by the resistances 54, 56 and 58 then if the transistor 200 is non-conductive during a thermal or oil pressure shut-down. The collector of the transistor 200 is connected to the emitter of an NPN transistor 208 having its collector connected to one end of the winding 104 which has its other end connected to the unipolarity power junction 120. A protection diode 209 is connected across the winding 104.

The primary winding 95 is the primary winding of a relatively small step-up and isolation transformer indicated generally at 214 which has a small magnetic core 216 and a secondary winding 218. A load resistance 219 is connected across the secondary winding 218. The transformer 214 is designed such that for relatively low amperage contactors all or the principle portion of current passes through the winding 95 to produce a suitable signal output on the secondary winding 218, and for larger current drawing contactors, most of the contactor winding current passes through the diodes 92 and 94 due to the impedance of the primary winding 95. The diodes 92 and 94 have a selected forward voltage drop sufficient to produce suitable current through the primary winding 95 to produce a suitable output signal in the secondary winding 218 for such larger currents.

One end of the secondary winding 218 is connected to the common junction 110 while the other end of the winding 218 is connected to the anode of a diode 220. The cathode of the diode 220 is connected by a resistance 222 to one side of a filtering capacitance 224 which has its other side connected to the common junction 110. The base of an NPN transistor 228 is connected by resistance 230 to the junction between the capacitance 224 and the resistance 222. A resistance 232 connects the base of the transistor 228 to the common junction 110 and has a value suitable for biasing the transistor non-conductive. Resistances 234 and 236 are serially connected between the base of the transistor 228 and the unipolarity voltage junction 120. A junction between the collector of the transistor 228 and a load resistance 238 connected to the unipolarity power junction 120 is connected to the base of an NPN transistor 240 which has its emitter connected together with the emitter of the transistor 228 to the common junction 110. Diodes 242, 244 and 246 have their cathodes connected to the collector of the transistor 240 and have their anodes connected, respectively, to the junction between the diode 150 and the resistance 148, to the junction between the resistances 134 and 136, and to a junction 248 which is biased positive by a resistance 250 connected to the unipolarity power junction 120. The resistance 220 has a value selected to protect the base of the transistor 228 and to discharge the capacitance 224 through the resistance 232 in the event of loss of voltage from the line 219. Resistances 234 and 236 have relatively high values to provide a slight bias which is insufficient to maintain the transistor 228 conductive but sufficient to produce a relatively sharp triggering of the transistor 228 into its conductive and non-conductive states by shunting such slight bias to diode 244 as well as to produce a hysteresis effect from the voltage on capacitance 224, i.e., the turn-on voltage of capacitance 224 is substantially higher than the turn-off voltage.

The cathode of a zener diode 242 is connected to the junction 248 and the anode of the diode 252 is connected to the common junction 110. A filter capacitance 254 is connected across the zener diode 252. One side of a timing capacitance 256 is connected to the junction 248 while the other side of the capacitance 256 is connected to one end of a timing resistance 258 which is connected at its other end to the common junction 110. The junction between the capacitance 256 and the resistance 258 is connected to the gate electrode of an FET such as an N-channel junction field effect transistor 260 which has its source and drain electrodes connected, respectively, to the common terminal 110 and to one end of a load resistance 262 which is connected at its other end to the unipolarity power junction 120. The junction between the drain electrode of FET 260 and the resistance 262 is connected to the base of an NPN transistor 264 which has its emitter connected to the common junction 110. The collector of the transistor 264 is connected by a load resistance 266 to the power junction 120. Diodes 268 and 270 have their cathodes joined to the collector of the transistor 264 while the anodes of the diodes 268 and 270 are connected, respectively, to the junction 248 and to one end of a resistance 274 which has its other end connected to the power junction 120. The junction between the resistance 172 and diode 270 is connected to the anode of a diode 278 which has its cathode connected to the base of the transistor 208.

In operation of the motor protection system of FIG. 1, the energization of the motor 10 is controlled by the contactor winding 26 in response to the thermostatically controlled contacts 44, the electrical protective unit 28, and the high pressure contacts 36. Normally the unit 28 completes conductive paths from terminal 34 to both terminals 33 and 47. Operation of the thermostatic contacts 44 in response to a demand for cooling operates the solenoid 46 to open the valve in the suction line to the compressor allowing the low pressure switch to close the contacts 30 thus energizing the contactor winding 26. Upon satisfaction of the demand for cooling, the thermostatic contacts 44 deoperate the solenoid 46 to close the valve in the suction line to the compressor thus allowing the compressor to pump-down its suction input to open the contacts 30 and thus de-energize the contactor winding 26 and the motor 10. In the event of an excessive high pressure in the output of the compressor, the contacts 36 open to de-energize the contactor winding 26.

Generally in the circuit unit 28 as shown in FIG. 2, the conductive path in the contactor energization circuit 80 between the terminal 34 and the terminals 33 and 47 is controlled by the triac 90. Energization of the triac 90 is controlled by the relay contacts 102 which in turn are operated by the transistors 200 and 208 energizing the winding 104. The transistors 200 and 208 are controlled by the voltage levels on the junction 180 and the output of the delay after break circuit 86, respectively. The thermal protection circuit 82 is responsive to one or more of the thermal sensing resistances 54, 56 and 58, sensing an excessively high temperature in the motor windings of the motor 10 to produce a high on the junction 180 which renders the transistor 200 non-conductive terminating operation of the triac 90. The oil pressure protection circuit 84 senses an open condition of the oil pressure switch 48 indicating an insufficient oil pressure for too long a duration to also apply a high to the junction 180 to de-energize the triac 90. The delay after break circuit 86 responds to the termination of current flow through the energization circuit 80 sensed by the transformer 214 to render the transistor 208 non-conductive for a predetermined duration and thus hold the triac 90 unenergized for a sufficient time to allow the high pressure output from the compressor to dissipate to a lower pressure.

In the thermal protection circuit at normal temperatures, the junctions 60, 62, and 64 in the thermal sensing circuit 82 are positive with respect to the junction 133 to produce low outputs on the amplifiers 134, 136 and 138. In the event that one or more of the resistances 54, 56 and 58 sense excessively high temperatures, the respective terminals 60, 62 and 64 become low with respect to the terminal 133 producing high outputs on the respective amplifiers 134, 136 and 138.

In the oil protection circuit 84 the timing capacitance 154 is normally maintained in a substantially discharged condition by the closing of the oil pressure switch 48, FIG. 1, across the terminals 50 and 52. If the oil pressure switch opens due to loss of oil pressure in the motor, 10, the capacitance 154 is allowed to charge by current through the timing resistance 148 to render the non-inverting input of the amplifier 146 positive with respect to its inverting input to thus produce a high output on the amplifier 146. The charge on the capacitance 154 will be maintained by current flow from the output of the amplifier 146 through the resistance 168 and the diode 170. The oil pressure protection is reset by manual operation of the switch 68 to discharge the capacitance 154.

Normally the OR junction 180 is held low by the connection through resistance 182 to the common terminal 110 to render the Darlington pair 184 and the transistor 200 conductive. When the junction 180 is driven high by the output of one or more of the amplifiers 134, 136, 138 and 146, the Darlington pair 184 is rendered non-conductive which in turn drops the voltage on the base of the transistor 200 to render the transistor 200 non-conductive. Thus current flow through the relay winding 104 is terminated which opens contacts 102 to terminate the energization of the triac 90 and the current flow through the contactor energization circuit 80 between the terminal 34 and the terminals 33 and 47.

When the transistor 200 is rendered conductive the resistance 204 is connected in parallel with the resistance 132 to lower the standard reference voltage on the junction 133. This casuses the amplifiers 134, 136 and 138 to only respond to the resistances 54, 56 and 58 sensing a relatively high temperature in the windings. Once the transistor 200 has been rendered non-conductive the resistance 204 is no longer connected in parallel with the resistance 132 and thus the reference voltage on the junction 133 is increased to require the amplifiers 134, 136 and 138 to respond only to a lower temperature sensed by the resistances 54, 56 and 58.

In the delay after break circuit 86, at least a portion of the current in the contactor energization circuit 80 passes through the primary winding 95 of the transformer 218 to produce a signal in the output or secondary winding 218 which is rectified by diode 220 and applied to the capacitance 224 to charge the capacitance 224, With the capacitance 224 charged the transistor 228 is rendered conductive to drive the transistor 240 non-conductive preventing current conduction through any of the diodes 242, 244 and 246. The junction 248 will be rendered high to the voltage rating of the zener diode 252 which after a duration causes the capacitance 256 to be charged by current through the timing resistance 258 to about the voltage across the junctions 248 and 110. The FET 260 is held conductive by the zero or slight positive woltage due to leakage current through the capacitance 256 to maintain the transistor 264 non-conductive which applies a high to the base of the transistor 208 to render the transistor 208 conductive.

When the current in the contactor energization circuit 80 terminates, the signal produced on the secondary winding 218 also terminates resulting in the charge on the capacitance 224 dissipating through the resistances 230 and 232. When the voltage on the base of the transistor 228 reaches a sufficiently low level, the transistor 228 begins to turn off rendering its collector high which in turn initiates conduction in the transistor 240. Feedback from the diode 244 and the resistance 234 aids in quickly driving the transistor 228 non-conductive and the transistor 240 fully conductive. When the transistor 240 becomes conductive the junction 248 goes low which renders the gate of FET 260 negative due to the charge on the capacitance 256 to thus turn the FET 260 off. The drain electrode of FET 260 goes high rendering the transistor 264 conductive allowing current through the diode 270 to drop the voltage on the junction between the resistance 274 and diode 270 to render the transistor 208 non-conductive preventing current flow through the relay winding 104 and thus preventing the energization of the triac 90. After a duration determined by the values of the capacitance 256 and resistance 258, the capacitance 256 discharges sufficiently to render the FET 260 conductive thus terminating conduction through the transistor 264 and once again rendering the transistor 208 conductive. Now the operation of the motor 10 may be initiated by conduction through the contactor energization circuit 80.

It is particularly advantageous to utilize current sensing means such as tranformer 214 to sense current flow in the contactor energization circuit 80. Referring to FIG. 1 it is noted that the connections to terminals 40 and 42, of the electrical protection circuit 28 may be reversed without effecting operation of the circuit; such reversal was not possible with the prior art protection units. The use of the diodes 92 and 94 together with the low current primary winding 95 allows for the use of the electrical circuit unit 28 with a large variety of contactors requiring varying magnitudes of current. It is noted that the current through the thermostatic contacts 44 and the valve solenoid 46 does not pass through the current sensor, thus false contactor current sensing it prevented.

Figure 3:
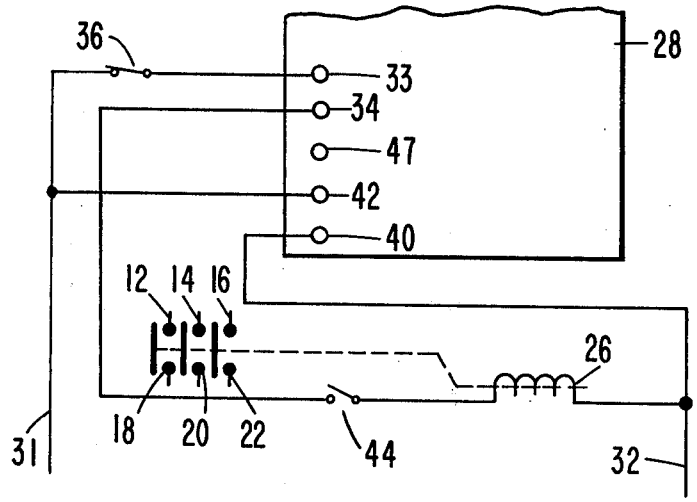
FIG. 3 is a diagram of a modification of the protection circuit of FIG. 1.

In the variation shown in FIG. 3 the control contacts 44 are connected in series with the contactor winding 26, and the pump-down valve and low pressure responsive switch have been eliminated. The terminal 33 is connected through the high limit switch 36 to the line 31, and the thermostatic contacts 44 and contactor winding 26 are connected in series between the terminal 34 and the line 32. In the variation of FIG. 3 the connections to the terminals 33 and 34 may be reversed and/or the connections to the terminals 40 and 42 may be reversed without affecting operation of the motor protection system; such reversal of connection not being possible in the prior art protection circuits.

Figure 4:
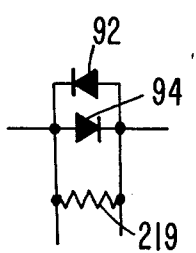
FIG. 4 is a circuit diagram of a modification of the circuitry in FIG. 2.

In the modification of FIG. 4, the transformer 214 is eliminated and the resistance 219 is placed directly across the parallel oppositely poled diodes 92 and 94. The forward voltage drop of the diodes 92 and 94 and the values of resistances 222, (FIG. 2), 230 and 232 are selected to render the transistor 228 conductive when current flows through the diodes 92 and 94.

Since many variations, modifications and changes in detail may be made in the described embodiment, it is intended that all matter shown in the drawings or described in the foregoing description be interpreted as illustrative and not in a limiting sense.

What is claimed is:

1. A protection circuit unit for connection in a motor system including a contactor having a contactor winding and contacts operated when the contactor winding is energized to connect the motor to an electrical source, the circuit unit comprising
   a pair of terminals adapted to be connected in series with the contactor winding across an AC source,
   a contactor energization circuit connected between the pair of terminals,
   said contactor energization circuit including switch means for controlling the energization of the contactor winding,
   said contactor energization circuit further including current sensing means connected in series with the switch means in the contactor energization circuit for producing a signal only during current flow through the contactor winding,
   said current sensing means being independent of which terminal of the pair of terminals the contactor winding is connected with, and
   delay after break means responsive to termination of the signal from the current sensing means for preventing operation of the switch means for a predetermined duration after the termination of the signal from the current sensing means.

2. A motor protection circuit unit as claimed in claim 1 wherein said current sensing means includes
   a pair of parallel connected diodes of opposite polarities connected in series with the switch means.

3. A motor protection circuit as claimed in claim 1 wherein said current sensing means includes a transformer having a primary winding connected in series with the switch means and having a secondary winding for producing the signal indicating current flow through the contactor winding.

4. A motor protection circuit unit as claimed in claim 3 wherein said current sensing means also includes a pair of diodes connected in parallel with opposite polarities across the primary winding.

5. A motor protection circuit unit as claimed in claim 1 wherein said delay after break means includes
   rectifying means coupled to the current sensing means,
   a filter capacitance connected to the output of the rectifying means,
   a timing capacitance,
   a timing resistance connected in series with the timing capacitance,
   semiconductor trigger means for changing the voltage on one side of the timing capacitance in response to a predetermined voltage on the filter capacitance, and
   transistor means connected to the other side of the timing capacitance and to the switch means for preventing operation of the switch means for a predetermined duration.

6. A motor protection circuit unit for connection in a motor system including a contactor having a contactor winding and contacts operated when the contactor winding is energized to connect the motor to an electrical source, the circuit unit comprising
   switch means for connection in series with the contactor winding to control the energization of the contactor winding from an AC source;
   current sensing means connected in series with the switch means for producing a signal indicating current flow through the contactor winding;
   timing means responsive to termination of the signal from the current sensing means for preventing operation of the switch means for a predetermined duration;
   said timing means including rectifying means coupled to the current sensing means, a filter capacitance connected to the output of the rectifying means, a timing capacitance, a timing resistance connected in series with the timing capacitance, semiconductor trigger means for changing the voltage on one side of the timing capacitance in response to a predetermined voltage on the filter capacitance, and transistor means connected to the other side of the timing capacitance and to the switch means for preventing operation of the switch means for a predetermined duration; and
   said semiconductor trigger means including means connected between an output of the trigger means and an input of the trigger means to change the response of the trigger means so that when the trigger means has changed the voltage on the one side of the timing capacitance to operate the transistor means to prevent the operation of the switch means, the trigger means is responsive only to a first predetermined voltage on the filter capacitance, and so that when the trigger means has change back the voltage on the one side of the timing capacitance, the trigger means is responsive to only a second predetermined voltage, said first predetermined voltage being substantially greater than said second predetermined voltage.

7. A protection circuit unit for connection in a motor protection system including a contactor having a contactor winding and having contacts operated when the contactor winding is energized to connect the motor to an electrical source, the circuit unit comprising
- a pair of contactor energization terminals adapted to be connected in series with the contactor winding across the AC source,
- a contactor energization circuit connected between the pair of terminals,
- said contactor energization circuit including series switch means for controlling the energization of the contactor winding,
- said contactor energization circuit further including current sensing means connected in series with the switch means in the contactor energization circuit for producing a signal only during current flow through the contactor winding,
- said current sensing means being independent of which terminal of the pair of terminals the contactor winding is connected with,
- oil pressure responsive means including timing means for terminating operation of the switch means in the event that there is an absense of oil pressure during a predetermined duration of operation of the motor, and
- means responsive to the absense of a signal from the current sensing means for preventing the operation of the oil pressure responsive means.

8. A protection circuit unit as claimed in claim 7 wherein said current sensing means includes a pair of parallel connected diodes having opposite polarities connected in series with the switch means.

9. A motor protection circuit unit as claimed in claim 7 wherein said current sensing means includes a transformer having a primary winding connected in series with the switch means and having a secondary winding for producing the signal indicating current flow through the contactor winding.

10. A motor protection circuit unit as claimed in claim 9 wherein said current sensing means also includes a pair of diodes connected in parallel with opposite polarities across the primary winding.

11. A motor protection circuit unit for connection in a motor protection system including a contactor having a contactor winding and having contacts operated when the contactor winding is energized to connect the motor to an electrical source, the circuit unit comprising
- switch means for connection in series with the contactor winding to control the energization of the contactor winding from an AC source,
- current sensing means connected in series with the switch means for producing a signal indicating current flow through the contact winding,
- oil pressure responsive means including timing means for terminating operation of the switch means in the event that there is an absense of oil pressure during a predetermined duration of operation of the motor,
- means responsive to the absense of a signal from the current sensing means for preventing the operation of the oil pressure responsive means, and
- delay after break means responsive to termination of the signal from the current sensing means for preventing operation of the switch means for a predetermined duration after the termination.

12. A motor protection circuit unit as claimed in claim 11 including rectifying means connected to the current sensing means, a filter capacitance connected to the output of the rectifying means, and a semiconductor trigger means changing from a low to a high state in response to a predetermined voltage on the filter capacitance;
- said oil pressure protection means including a first timing capacitance and a first timing resistance connected in series, and means connecting the output of the semiconductor trigger means across the first timing capacitance and first timing resistance; and
- said delay after break means including a second timing capacitance and a second timing resistance connected in series, means connecting the output of the semiconductor trigger means to one side of the second timing capacitance, and transistor means connected to the other side of the second timing capacitance and to the switch means to prevent operation of the switch means for a predetermined duration.

13. A motor protection circuit unit as claimed in claim 12 wherein the semiconductor trigger means includes means connected between an output of the trigger means and an input of the trigger means to change the response of the trigger means so that trigger means responds to a first voltage on the filter capacitance when the output is high and responds to a second voltage on the output of the filter capacitance when the output is low, said first voltage on the filter capacitance being substantially less than the second voltage.

* * * * *